United States Patent
Hesler et al.

(10) Patent No.: US 9,756,868 B2
(45) Date of Patent: Sep. 12, 2017

(54) HIGHLY STABLE AERATED OIL-IN-WATER EMULSION

(71) Applicant: CSM Bakery Solutions Europe Holding B.V., Amsterdam (NL)

(72) Inventors: Michael Hesler, Lilburn, GA (US); Wendy Zhang, Lilburn, GA (US)

(73) Assignee: CSM Bakery Solutions Europe Holding B.V., Amsterdam (NL)

(*) Notice: Subject to any disclaimer, the term of this patent is extended or adjusted under 35 U.S.C. 154(b) by 0 days.

(21) Appl. No.: 14/616,526

(22) Filed: Feb. 6, 2015

(65) Prior Publication Data

US 2016/0227807 A1    Aug. 11, 2016

(51) Int. Cl.

| | | |
|---|---|---|
| *A23D 7/005* | (2006.01) | |
| *A23D 7/04* | (2006.01) | |
| *A23P 30/40* | (2016.01) | |
| *A23G 1/36* | (2006.01) | |
| *A23G 1/52* | (2006.01) | |
| *A23G 1/56* | (2006.01) | |

(52) U.S. Cl.
CPC ............. *A23D 7/0053* (2013.01); *A23D 7/04* (2013.01); *A23G 1/36* (2013.01); *A23G 1/52* (2013.01); *A23G 1/56* (2013.01); *A23P 30/40* (2016.08); *A23V 2002/00* (2013.01)

(58) Field of Classification Search
CPC . A23G 9/34; A23G 9/36; A23D 7/003; A23D 7/004; A23D 7/0053
USPC .......................... 426/564, 565, 567, 570, 572
See application file for complete search history.

(56) References Cited

U.S. PATENT DOCUMENTS

| | | | | |
|---|---|---|---|---|
| 4,711,788 A | * | 12/1987 | Porcello ................... | A23L 9/20 426/572 |
| 5,962,058 A | * | 10/1999 | Ono ...................... | A23D 7/011 426/564 |
| 6,203,841 B1 | * | 3/2001 | Lynch et al. ................. | 426/564 |
| 2007/0003681 A1 | | 1/2007 | Kim | |
| 2007/0178209 A1 | * | 8/2007 | Bialek et al. ................. | 426/565 |
| 2008/0069924 A1 | | 3/2008 | Zeller et al. | |

FOREIGN PATENT DOCUMENTS

| | | | |
|---|---|---|---|
| NL | EP1477072 | * | 5/2003 |
| WO | WO 98/31236 | | 7/1998 |
| WO | WO 02/19840 | | 3/2002 |
| WO | WO 2013/075939 A1 | | 5/2013 |

OTHER PUBLICATIONS

"Nutrient Content of Milk Varieties". Available online as of May 26, 2015 from www.milkfacts.info. pp. 1-13.*
"Baked Alaska". Available from saveur.com as of Jan. 21, 2014. pp. 1-3.*
"Stabilizing oil-in-water emulsions with cyclodextrins." Available online from www.wacker.com as of Nov. 3, 2012. pp. 1-3.*
"Vegetarian-grade stabilizer for novel food applications". Available online from www.foodproductdesign.com as of Jul. 15, 2013. pp. 1-2.*
"Whipped Cream Cake". From the Kitchen of Rose, available online as of Jan. 22, 2010 from www.realbakingwithrose.com. pp. 1-33.*
"Typical Fatty-acid Compositions of Some Common Fats". Adapted from Gunstone, F. Fatty acid and Lipid chemistry; Blackie: London, 1996. pp. 1-2.*
"Stabilizers, Naturally". Available online Oct. 1, 2007 from www.naturalproductsinsider.com. pp. 1-8.*

* cited by examiner

*Primary Examiner* — Jenna A Watts
(74) *Attorney, Agent, or Firm* — Gilberto M. Villacorta; Sunit Talapatra; Foley & Lardner LLP

(57) ABSTRACT

The invention relates to an oil-in-water (O/W) emulsions that can be aerated to produce foamed emulsions. The O/W emulsions of the present invention consist of: 20-45 wt. % water; 4-40 wt. % oil; 3-12 wt. % of cyclodextrin selected from alpha-cyclodextrin, beta-cyclodextrin and combinations thereof; 20-60 wt. % of saccharides selected from monosaccharides, disaccharides, non-cyclic oligosaccharides, sugar alcohols and combinations thereof; 0-30 wt. % of other edible ingredients; wherein the emulsion contains at least 80% of the saccharides by weight of water. The O/W emulsions of the present invention are capable of forming foamed emulsions with high firmness and excellent shape retaining properties. These foamed emulsions further offer the advantage that they exhibit excellent stability.

33 Claims, No Drawings

HIGHLY STABLE AERATED OIL-IN-WATER EMULSION

TECHNICAL FIELD OF THE INVENTION

The present invention relates to highly stable aerated oil-in-water (O/W) emulsions. More particularly the invention provides aerated O/W emulsions that can be applied as, for instance, toppings or filings.

The aerated emulsions according to the present invention consists of:
- 20-45 wt. % water;
- 4-40 wt. % oil;
- 3-12 wt. % of cyclodextrin selected from alpha-cyclodextrin, beta-cyclodextrin and combinations thereof;
- 20-60 wt. % of saccharides selected from monosaccharides, disaccharides, non-cyclic oligosaccharides, sugar alcohols and combinations thereof;
- 0-30 wt. % of other edible ingredients;

wherein the emulsion contains at least 80% of the saccharides by weight of water.

The aerated emulsions of the present invention are very stable under ambient conditions and can withstand elevated temperatures.

The invention further relates to an aeratable O/W emulsions that can be whipped or otherwise aerated to yield a highly stable foam. Also provided is a process for the manufacture of such an aeratable O/W emulsion.

BACKGROUND OF THE INVENTION

Aerated O/W emulsions are commonly used as toppings and fillings for various kinds of cakes and pies, as well as for a variety of other foodstuffs. Aerated O/W emulsion are usually prepared by introducing air or other gas into an aeratable O/W emulsion with fluid characteristics. The aeratable O/W emulsion typically comprises water, liquid oil, solid fat, sugars and protein. Typically the air/gas is mechanically mixed (e.g. whipped) into the emulsion in a manner that creates a dispersion of very fine gas bubbles. These bubbles have to be stabilized in order to allow the O/W emulsion to form a voluminous foam upon aeration and further to prevent the foam from collapsing.

Aeration and the introduction of air/gas initially destabilize O/W emulsions, because agitation favors the coalescence of fat globules. Aeration of creams yields a foam that comprises a continuous aqueous phase, dispersed gas bubbles and partially coalesced fat globules. In aerated creams the air-water interface is stabilized by partially coalesced fat globules that are held together by fat crystals.

During aeration of creams partial coalescence of fat globules and association with fat crystals yields a rigid network in which air bubbles as well as liquid (water phase and oil phase) are entrapped. This network also prevents further coalescence of the fat globules into bigger fat globules that are no longer capable of structure-building and that would cause the foam to collapse. Fat crystals break and penetrate the interfacial layer around the fat globules in the emulsion, allowing fat globules to clump together into the network.

Coalescence of fat globules during and after aeration is influenced by the type and amount of emulsifier in the O/W emulsion. Proteins, for example, can reduce the susceptibility of fat globules to coalesce by forming a layer around the fat globules, which increases the repulsive forces and the resistance to penetration of the fat globules by fat crystals.

In many aeratable O/W emulsions the presence of solid fat is a crucial factor for stabilization of the aerated emulsions. This is evident from the fact that aearated emulsions that are stabilized by solid fat, such as whipped cream, quickly collapse when the solid fat contained therein is melted by temperature increase.

Non-dairy toppings are a widely-used substitute to dairy toppings. Industrial bakers and patissiers use these non-dairy alternatives because of their superior stability, making them ideal for decoration, coverings and fillings.

WO 98/31236 describes non-dairy whipped toppings comprising a temperature stabilizing effective amount of a non-tropical lauric oil. The patent examples describe whipped toppings that contain as the main components water (52.18 wt. %), oil (23.24 wt. %), high fructose corn syrup (24.18 wt. %), and 0.30 wt. % hydroxypropyl methylcellulose.

WO 2002/019840 describes non-dairy whipped toppings having enhanced temperature stability and good organoleptic properties. These whipped toppings contain as the main components water (20.3 wt. %) oil (24.2 wt. %), high fructose corn syrup (52.0 wt. %) and sodium caseinate (1.25 wt. %).

Cyclodextrins are a family of cyclic oligosaccharides that are produced from starch by means of enzymatic conversion. Cyclodextrins are composed of 5 or more α-(1,4) linked D-glucopyranoside units, as in amylose (a fragment of starch). Typical cyclodextrins contain a number of glucose monomers ranging from six to eight units in a ring, creating a cone shape:
- α (alpha)-cyclodextrin: 6-membered sugar ring molecule
- β (beta)-cyclodextrin: 7-membered sugar ring molecule
- γ (gamma)-cyclodextrin: 8-membered sugar ring molecule Because cyclodextrins have a hydrophobic inside and a hydrophilic outside, they can form complexes with hydrophobic compounds. Thus they can enhance the solubility and bioavailability of such compounds. This is of high interest for pharmaceutical as well as dietary supplement applications in which hydrophobic compounds shall be delivered. Alpha-, beta-, and gamma-cyclodextrin are all generally recognized as safe by the FDA.

The application of cyclodextrins in aerated oil-in-water emulsions has been described in patent publications.

US 2007/0003681 describes aerated food compositions containing protein, oil and cyclodextrin. The cyclodextrin is said to enable generation of a more stable and greater overrun protein-stabilized foam in the presence of liquid oils as compared to oil-containing food products lacking the cyclodextrin. The patent examples describe an ice cream containing skim milk (56.1 wt. %), canola oil (19.6 wt. %), sugar (17.4 wt. %), alpha cyclodextrin (6.5 wt. %) and vanilla extract (0.4 wt. %).

US 2008/0069924 describes a gasified food product comprising an alpha-cyclodextrin-gas clathrate. Food products mentioned in the US patent application are a dry mix, a liquid solution, a dough, a batter, a baked product, a ready-to-eat product, a ready-to-heat product, a liquid concentrate, a beverage, a frozen beverage, and a frozen product.

WO 2013/075939 describes aerated carbohydrate rich food compositions containing cyclodextrin. Examples 1-8 describe whipped apple sauces containing apple sauce, alpha-cyclodextrin (7 or 10 wt. %), vegetable oil (10 wt. %). Examples 32 and 33 describe whipped chocolate syrups containing chocolate syrup, soy oil (10 wt. %) and alpha-cyclodextrin (7.0 wt. %).

Although, as explained before, non-dairy whipped toppings are more stable than their dairy counterparts, there is a need for whipped toppings that are more stable than those currently available on the market. In particular, there is a need for whipped toppings that can be stored for several days under ambient or refrigerated conditions without significant loss of quality.

SUMMARY OF THE INVENTION

The inventors have developed oil-in-water emulsions that can be aerated to produce foamed emulsions, e.g. toppings or fillings, that are highly stable under ambient conditions and that do not collapse at elevated temperatures.

The O/W emulsions of the present invention (aerated or non-aerated) consist of:
- 20-45 wt. % water;
- 4-40 wt. % oil;
- 3-12 wt. % of cyclodextrin selected from alpha-cyclodextrin, beta-cyclodextrin and combinations thereof;
- 20-60 wt. % of saccharides selected from monosaccharides, disaccharides, non-cyclic oligosaccharides, sugar alcohols and combinations thereof;
- 0-30 wt. % of other edible ingredients;

wherein the emulsion contains at least 80% of the saccharides by weight of water.

Although the inventors do not wish to be bound by theory, it is believed that the cyclodextrin in the present O/W emulsion accumulates at the oil-water interface where the hydrophobic inside of the cyclodextrin engages with fatty acid residues of the glycerides that make up the oil phase. This interaction causes the formation of cyclodextrin-oil inclusion complexes that act as a structuring agent, fulfilling a similar role as crystalline fat in ordinary whipped toppings. It is believed that the very high saccharide content of the aqueous phase promotes the cyclodextrin-oil interaction, thereby strengthening the rigidity of the structuring network that is formed as a result of this interaction.

The O/W emulsions of the present invention are capable of forming whipped toppings with high firmness and excellent shape retaining properties. In terms of taste and texture these whipped toppings are at least as good as existing non-dairy whipped toppings. The whipped toppings produced by aeration of the present O/W emulsion are clearly superior to existing whipped toppings in terms of stability, especially ambient stability.

The invention enables the preparation of aerated emulsions that are shelf-stable under ambient conditions for several days. Shape and textural properties (e.g. firmness, viscosity) of these aerated emulsions hardly change during storage. Since the emulsions typically have a very low water activity, they are sufficiently microbially stable to be kept under ambient conditions for several days.

It was surprisingly found that the aerated emulsion of the present invention can be heated to a temperature of 32° C. (90° F.), or even higher, without destabilizing. The aerated emulsion is also stable under refrigeration conditions and has freeze/thaw stability. The aerated emulsion may be stored at −23° C. (−9° F.) for 6 months. The inventors have found that upon thawing to 21° C. (70° F.) the aerated emulsion exhibits very good icing performance and stability at ambient temperature for at least 7 days or at refrigerated temperature (4° C./39° F.), for at least 14 days.

Thus, the aerated O/W emulsions of the present invention can suitably be used as a topping or filling for all types of foodstuffs, especially for foodstuffs that need to be shelf-stable under ambient conditions or that are subjected to elevated temperatures, e.g. when they are prepared for consumption.

The invention also provides a process of preparing the aforementioned O/W emulsion, said process comprising mixing oil and cyclodextrin to prepare an oil-and-cyclodextrin mixture, followed by mixing this mixture with one or more water-continuous components.

DETAILED DESCRIPTION OF THE INVENTION

Accordingly, a first aspect of the invention relates to an aerated or non aerated oil-in-water emulsion comprising a continuous aqueous phase and a dispersed oil phase, said emulsion consisting of:
- 20-45 wt. % water;
- 4-40 wt. % oil;
- 3-12 wt. % of cyclodextrin selected from alpha-cyclodextrin, beta-cyclodextrin and combinations thereof;
- 20-60 wt. % of saccharides selected from monosaccharides, disaccharides, non-cyclic oligosaccharides, sugar alcohols and combinations thereof;
- 0-30 wt. % of other edible ingredients;

wherein the emulsion contains at least 80% of the saccharides by weight of water.

The term 'fat' and 'oil' as used herein, unless indicated otherwise, refers to lipids selected from triglycerides, diglycerides, monoglycerides, fatty acids, phosphoglycerides and combinations thereof.

The term "alpha cyclodextrin' as used herein refers to a cyclic oligosaccharide of six glucose units that are covalently attached end to end via $\alpha$-1,4 linkages.

The term "beta-cyclodextrin" as used herein refers to a cyclic oligosaccharide of seven glucose units that are covalently attached end to end via $\alpha$-1, 4 linkages.

The term 'oligosaccharide' as used herein refers to a saccharide polymer containing 3 to 9 monosaccharide units.

The term 'sugar alcohol' as used herein refers to a polyol having the general formula $H(HCHO)_nH$ or $C_6H_{11}O_6$—$CH_2$—$(HCHO)_oH$. Most sugar alcohols have five- or six carbon chains, because they are derived from pentoses (five-carbon sugars) and hexoses (six-carbon sugars), respectively. Other sugar alcohols may be derived from disaccharides and typically contain eleven or twelve carbon atoms. Examples of sugar alcohols containing 12 carbon atoms include mannitol and sorbitol. Erythritol is a naturally occurring sugar alcohol that contains only four carbon atoms.

The terms "wt. %" and "% by weight" refer to the concentration expressed on a weight-by-weight basis (% (w/w)).

The term "specific gravity" as used herein refers to ratio of the density of the aerated O/W emulsion to the density (mass of the same unit volume) of water, both densities being determined at 20° C.

Whenever reference is made herein to the viscosity of an unaerated emulsion, unless indicated otherwise, this viscosity is determined at 20° C. (60° F.) at 20 rpm, using a Brookfield Digital Viscometer Model DV-E viscometer and Helipath spindle B.

Whenever reference is made herein to the viscosity of an aerated emulsion, unless indicated otherwise, this viscosity is determined at 20° C. (68° F.) at 10 rpm, using a Brookfield Digital Viscometer Model DV-E viscometer and Helipath spindle F.

The solid fat content of the oil phase at a particular temperature is determined by measuring the so called N-value at that temperature. The N value at temperature x ° C. is referred to in here as $N_x$ and represents the amount of solid fat at a temperature of x ° C. These N-values can suitably be measured using the generally accepted analytical method that is based on NMR measurements (AOCS official method Cd 16b-93): Sample pre-treatment involves heating to 80° C. (176° F.) 15 minutes, 15 minutes at 60° C. (140° F.), 60 minutes at 0° C. (32° F.) and 30 minutes at the measuring temperature The non-aerated emulsion typically has a specific gravity of at least 1.0. Preferably, the non-aerated emulsion has specific gravity in the range of 1.05 to 2.2.

The inventors have found that the ability of the present emulsion to produce a firm, stable aerated product is greatly affected by the viscosity of the non-aerated emulsion. Preferably, the non-aerated emulsion has a viscosity of at least 100 cP (mPa·s) at 20° C. (68° F.) and 20 rpm. More preferably, the non-aerated emulsion has a viscosity of 200-40,000 cP, more preferably of 300-20,000 cP, and most preferably of 350-12,000 cP.

The O/W emulsion of the present invention offers the advantage that it can be produced with a very low water activity, meaning that the emulsion exhibits high microbiological stability. Preferably, the emulsion has a water activity of less than 0.95, more preferably of less than 0.92, even more preferably of less than 0.90 and most preferably of 0.80 to 0.88.

The aqueous phase of the O/W emulsion typically has a pH in the range of 5.0 to 7.0, more preferably of 5.1 to 6.4 and most preferably of 5.2 to 6.2.

The water content of the O/W emulsion preferably lies in the range of 25 wt. % to 43 wt. %. More preferably, the water content is in the range of 26-40 wt. %, most preferably in the range of 28-38 wt. %.

The oil contained in the present emulsion is preferably selected from vegetable oil, milk fat and combinations thereof. Vegetable oils preferably represent at least at least 50 wt. %, more preferably at least 80 wt. % and most preferably at least 90 wt. % of the oil.

Surpringly, the aerated emulsion of the present invention does not require crystalline fat for stability. Thus, the present invention enables the preparation of stable aerated O/W emulsions that contain a reduced amount of high melting fat, notably fat containing saturated fatty acids (SAFA). Accordingly, in one embodiment of the invention, the oil present in the O/W emulsion contains not more than 40 wt. %, more preferably not more than 30 wt. % and most preferably not more than 20 wt. % of SAFA, calculated on total amount of fatty acid residues. Examples of low SAFA oils that may be employed include soybean oil, sunflower oil, rapeseed oil (canola oil), cottonseed oil and combinations thereof. Preferably, the oil contains at least 50 wt. %, more preferably at least 70 wt. % and most preferably at least 80 wt. % of vegetable oil selected from soybean oil, sunflower oil, rapeseed oil (canola oil), cottonseed oil, linseed oil, maize oil, safflower oil, olive oil and combinations thereof.

In case the O/W emulsion has a low SAFA content, said emulsion typically has a solid fat content at 20° C. ($N_{20}$) of less than 20%, more preferably of less than 14% and most preferably of less than 8%.

In accordance with another embodiment, the O/W emulsion contains a fat with a high SAFA content. The use of a fat with a high SAFA content offers the advantage that these fats enable the production of toppings and fillings that have very pleasant mouthfeel characteristics due to in-mouth melting of the fat component. Examples of fats with a high SAFA content that may suitably be employed include lauric fats such as coconut oil and palm kernel oil. Lauric fats offer the advantage that they rapidly melt in the temperature range of 20 to 30° C. and as a result are capable of imparting a cooling sensation when melting in the mouth. These lauric fats may be applied as such, or in the form of a fraction (e.g. a stearin fraction). Also hydrogenated and/or interesterified lauric fats can be applied. Preferably, the oil comprises at least 30 wt. %, more preferably at least 50 wt. % and most preferably at least 70 wt. % of lauric fat.

In case the O/W emulsion contains oil with a high SAFA content, the oil employed in the O/W emulsion typically has a solid fat content at 20° C. ($N_{20}$) of at least 10%, more preferably of at least 20% and most preferably of at least 30%. The solid fat content of the oil in the O/W emulsion preferably has a solid fat content at 35° C. ($N_{35}$) of less than 15%, more preferably of less than 12% and most preferably of less than 8%.

The oil of the present emulsion typically contains at least 80 wt. %, more preferably at least 90 wt. % of triglycerides.

The emulsion of the present invention preferably has an oil content of 5 wt. % to 30 wt. %. More preferably, the oil content is in the range of 6 to 25 wt. %, most preferably in the range of 8 to 20 wt. %.

The saccharides preferably constitute 25-55 wt. %, more preferably 35-50 wt. % and most preferably 40-45 wt. % of the emulsion. Saccharides represent the bulk of the solute present in the aqueous phase and have a significant influence on the viscosity and fluid dynamics of the O/W emulsion. The O/W emulsion preferably contains 90-250%, more preferably 100-200% and most preferably 110-180% of the saccharides by weight of water Monosaccharides preferably represent at least 40 wt. %, more preferably at least 55 wt. %, even more preferably at least 60 wt. % and most preferably at least 70 wt. % of the saccharides contained in the O/W emulsion. Preferably, the O/W emulsion contains 15-60 wt. %, more preferably 20-55 wt. % and most preferably 25-50 wt. % of monosaccharides selected from fructose, glucose and combinations thereof.

The monosaccharide content of the emulsion preferably is at least 70% by weight of water, more preferably at least 80% by weight of water and most preferably at least 90% by weight of water.

The O/W emulsion may suitably contain sugar alcohols. Sugar alcohols that are particularly suitable for use in the O/W emulsion include glycerol, erythritol, xylitol, mannitol, sorbitol, maltitol, lactitol and combinations thereof. Preferably, sugar alcohols are applied in the present emulsion in combination with monosaccharides.

The cyclodextrin employed in accordance with the present invention preferably is alpha-cyclodextrin.

Best results are obtained with the present O/W emulsion if it contains 4-10 wt. % of cyclodextrin. More preferably, the O/W emulsion contains 5-9 wt. % of cyclodextrin, even more preferably 6-8.5 wt. % of cyclodextrin and most preferably 6.5-8 wt. % of cyclodextrin.

The cyclodextrin content of the emulsion typically is in the range 20-120% by weight of the oil. More preferably, the cyclodextrin content is 25-85%, most preferably 28-60% by weight of oil.

Expressed differently, the emulsion typically contains cyclodextrin and oil in a molar ratio of cyclodextrin to oil in the range of 1:5 to 1:1, more preferably of 1:4 to 1:2.

The cyclodextrin employed in accordance with the present invention preferably is not a cyclodextrin-gas clathrate.

The O/W emulsion can suitably contain a variety of other edible ingredients, i.e. edible ingredients other than oil, water, cyclodextrin and saccharides. Examples of other edible ingredients that may suitably be contained in the O/W include emulsifiers, hydrocolloids, non-saccharide sweeteners, acidulants, preservatives, flavorings, colorings, vitamins, minerals, anti-oxidants, cocoa solids, milk solids, plant extracts, fruit juices, vegetable purees and combinations thereof. Typically, the O/W emulsion contains 0.1-20 wt. %, more preferably 0.2-15 wt. % and most preferably 0.3-10 wt. % of the other edible ingredients.

As explained herein before, the ability of the present emulsion to produce a firm, stable aerated product is greatly affected by the viscosity of the non-aerated emulsion. Although the inventors do not wish to be bound by theory, it is believed that a high viscosity enables entrapment and retention of air or other gas throughout the whipping process wherein gas cells are reduced to a small and stable size desired for whipped topping. Also, increasing the viscosity of the fluid phase occupying the space between gas cells reduces the rate of syrup drainage, thereby increasing shelf life. Yet another benefit of viscosifying particles in the fluid phase is the stabilization through so called Pickering effect in which solid particles are maintained about gas cells physically inhibiting coalescence. The viscosity of the present emulsion is affected by both the saccharide content and the presence of cyclodextrin-fat complexes. The inventors have found it advantageous to increase the viscosity of the emulsion by including a viscosifier. Preferably, the O/W emulsion contains 0.1-15 wt. %, more preferably 0.5-3 wt. % and most preferably 1.0-2.5 wt. % of a viscosifier.

The viscosifier employed in the present emulsion is preferably selected from starch, modified starch (e.g. maltodextrin or pregelatinized starch), dextrin, modified cellulose (e.g. carboxymethyl cellulose, methylcellulose, hydroxypropyl cellulose, microcrystalline cellulose), food gums (e.g. guar gum, locust bean gum, gellan gum, xanthan gum), glucomannan, agar-agar, carrageenan, alginate and combinations thereof. It should be understood that the invention also encompasses the use of the aforementioned viscosifiers in salt form.

According to a particularly preferred embodiment, the O/W emulsion of the present invention contains 0.03-1.2 wt. %, more preferably 0.05-1 wt. % and most preferably 0.1-0.8 wt. % of modified cellulose selected from carboxymethyl cellulose, hydroxypropyl cellulose and combinations thereof.

In accordance with another preferred embodiment of the invention the O/W emulsion contains 0.2-4 wt. %, more preferably 0.3-3 wt. %, most preferably 0.4-2.5 wt. % of a starch component selected from starch, modified starch and combinations thereof. Examples of modified starches that may suitably be employed in included hydrolyzed starch (maltodextrin) and pregelatinized (instant) starch. According to a particularly preferred embodiment, the emulsion contains 0.4-2.5 wt. % of pregelatinized starch.

In accordance with another preferred embodiment of the invention, the emulsion contains 0-3 wt. % of protein. Even more preferably, the emulsion contains 0-2 wt. % of protein and most preferably 0-1 wt. % of protein. Proteins that may suitably be employed in the emulsion include dairy proteins (e.g. non-fat dry milk, sodium caseinate and milk protein isolate) and vegetable proteins (e.g. soy protein isolate), dairy proteins being preferred. In non-dairy toppings proteins are widely used to improve whippability as well as foam stability. Surprisingly, the O/W emulsion of the present invention exhibit excellent whippability and foam stability even when no protein is contained in the emulsion.

The O/W emulsion of the present invention may suitably contain non-proteinaceous emulsifier. Examples of non-proteinaceous emulsifiers that can be employed include polysorbates (20, 40, 60, 65 & 80), sorbitan esters (Span 20, 40, 60, 65, 80, 85), polyglycerol esters of fatty acids, propylene glycol monostearate, propylene glycol monoesters, mono- and diglycerides of fatty acids, lactic acid esters of mono- and diglycerides of fatty acids, sucrose esters of fatty acids, sucroglycerides, sodium stearoyl lactylate and calcium stearoyl lactylate. Non-proteinaceous emulsifiers, notably emulsifiers having an HLB of 8 or more, are commonly used in whippable non-dairy creams to improve the whipping properties. The O/W emulsion of the present invention, however, does not require addition of non-proteinaceous emulsifier to achieve excellent whipping properties. Typically, the emulsion contains 0-1 wt. %, more preferably 0-0.5 wt. % and more preferably 0-0.3 wt. % of non-proteinaceous emulsifier having an HLB of 8 or more.

In accordance with a preferred embodiment, the present O/W emulsion is pourable at 20° C. Pourability ensures that the emulsion can easily be transferred from a container into, for instance, a whipping bowl.

The O/W emulsion of the present invention is preferably packaged in a sealed container. Since the present invention enables the preparation of aeratable emulsions with very low water activity it is not necessary to pasteurize or sterilize the emulsion. Preferably, the emulsion is a pasteurized emulsion.

The present invention pertains to non-aerated aeratable emulsions as well as to aerated O/W emulsions. The aerated emulsion preferably has a specific gravity of 0.25-0.75. More preferably, the aerated O/W emulsion has a specific gravity of 0.30-0.65, even more preferably a specific gravity of 0.32-0.55 and most preferably a specific gravity of 0.35-0.50.

The aerated emulsion of the present invention preferably is a firm foam that retains shape and definition for several days, and that does not suffer from fluid drainage or weeping even when kept under ambient conditions. Typically, the aerated emulsion has a viscosity of at least 10,000 cP (mPa·s) at 20° C. (68° F.) and 10 rpm. More preferably, the aerated emulsion has a viscosity of at least 20,000 cP, more preferably of at least 25,000 cP, and most preferably of 25,000-2,000,000 cP.

The aerated emulsion of the present invention may be frozen or non-frozen. The benefits of the present invention are particularly pronounced in aerated emulsions that are not frozen.

The aerated emulsions of the present invention exhibit exceptional stability. The specific gravity of the aerated emulsion of the present invention typically increases with not more than 20%, preferably with not more than 15% and most preferably with not more than 10% when the aerated emulsion is kept under ambient conditions for 1 day.

When the aerated emulsion is kept under ambient conditions for 7 days, the specific gravity of the aerated emulsion preferably does not increase with not more than 20%, more preferably with not more than 15% and most preferably with not more than 10%.

The aerated emulsion according to the invention preferably exhibits excellent heat stability in that the specific gravity of the aerated emulsion does not increase with not more than 12%, more preferably with not more than 8% and most preferably with not more than 4% when the aerated emulsion is kept at a temperature of 32° C. (99.6° F.) for 12 hours.

The stability of the aerated emulsion is further demonstrated a constant viscosity during ambient storage. Typically, the viscosity of the aerated emulsion (20° C. (68° F.), 10 rpm, spindle F) changes not more than 50%, more preferably not more than 30% and most preferably not more than 20% if the emulsion is kept at a temperature of 20° C. (68° F.) for 12 hours, or even for 48 hours.

Even if the aerated emulsion is heated to a temperature as high as 80° C. (176° F.), the specific gravity of the emulsion typically does not increase by more than 5% if the aerated emulsion is kept at this temperature for 5 minutes.

The quality of the aerated emulsion of the present invention remains essentially unchanged when the emulsion is kept under ambient conditions for several days (e.g. 1, 2 or 7 days), whereas an equivalent aerated emulsion lacking the cyclodextrin component quickly destabilizes under these same conditions.

Another aspect of the invention relates to a foodstuff comprising 0.5-50 wt. %, more preferably 1-20 wt. % of the aerated emulsion as described herein before.

Examples of foodstuffs encompassed by the present invention include cake, pie, custard, non-frozen dessert, frozen dessert, ice cream, fruit pieces and confectionary. The foodstuff can contain the aerated emulsion as a covering, as filling layers and/or as a core filling. Preferably, the foodstuff contains the aerated emulsion as a covering, e.g. as a topping, a frosting or an icing. Most preferably, the foodstuff contains the aerated emulsion as a topping. The aerated topping has suitably been applied onto the foodstuff in the form of extruded discrete amounts of topping.

The foodstuff of the present invention typically has a shelf life under ambient conditions of at least 5 days, more preferably of at least 7 days and most preferably of at least 10 days.

The invention also provides a method of preparing a foodstuff as described herein before, said method comprising heating the foodstuff containing the aerated emulsion to a temperature in excess of 60° C. (140° F.) for at least 1 minute, preferably for at least 3 minutes.

Yet another aspect of the invention relates to a process of preparing the O/W emulsion of the present invention, said process comprising mixing oil and cyclodextrin to prepare an oil-and-cyclodextrin mixture, followed by mixing this mixture with one or more water-continuous components. The inventors have found it advantageous to first combine the cyclodextrin and the oil before combining these ingredients with the aqueous components (e.g. water or milk) of the composition. This particular procedure is particularly beneficial when used in factory scale production of the present emulsion.

In a particular preferred embodiment of the invention, the process comprises the additional step of aerating the O/W emulsion, preferably aerating the emulsion to a specific gravity of 0.25-0.75.

The invention is further illustrated by the following non-limiting examples.

EXAMPLES

Example 1

A whippable topping was prepared on the basis of the recipe shown in Table 1.

TABLE 1

| Ingredient | Wt. % |
|---|---|
| Fat[1] | 9.00 |
| Alpha-cyclodextrin[2] | 6.50 |
| High fructose corn syrup (42%)[3] | 63.60 |
| Sodium carboxymethyl cellulose[4] | 0.20 |
| Modified instant corn starch[5] | 1.00 |
| Sodium chloride | 0.40 |
| Sodium alginate[6] | 0.20 |
| Calcium sulfate | 0.10 |
| Lactic acid solution (80%) | 0.04 |
| Water | 18.00 |
| Potassium sorbate (30%) | 0.66 |
| Cream flavour | 0.30 |

[1]Ultimate ® 110 (ex Cargill, USA), blend of refined, bleached, hydrogenated and deodorized coconut and soybean oils; Iodine Value = 1.5, Mettler Dropping Point 106-114° F.
[2]Cavamax ® W6 (ex Wacker Biosolutions, Germany) - Water content is 11% max.
[3]IsoClear ® (ex Cargill, USA) - Water content is 29%
[4]CMC 7HF (ex Aqualon, USA)
[5]Mira-Thik ® 603 (ex, Tate&Lyle, USA)
[6]Dariloid ® (ex FMC BioPolymer, USA)

The whippable emulsion was prepared using the following procedure:
Melt the oil/shortening at 46° C. (115° F.) and stir in all the alpha-cyclodextrin to disperse the cyclodextrin throughout the oil.
Place the high fructose corn syrup (HFCS) in a high shear blender (Waring multispeed blender) and add the carboxymethyl cellulose (CMC) with high speed mixing. Mix for 3 minutes under maximum shear. Use microscope to confirm that CMC is fully dispersed.
Blend starch, salt, alginate and calcium sulfate together. Add these to the HFCS/CMC blend under high shear (Waring multispeed blender). Mix dry ingredients for 2 minutes and with mixer continuing to run add lactic acid. Mix thoroughly, about 15 seconds.
Blend potassium sorbate solution into hot water having a temperature of 46° C. (115° F.). Then add the flavor to it.
Introduce the HFCS-containing dry mix into the mixing bowl of a Hobart mixer (Model N-50 table top mixer, standard paddle). Add the oil/cyclodextrin mixture. Stir at speed 1 until well mixed. This takes about 1-2 minutes, during which time the viscosity increases. With the mixer running on Speed 1 slowly pour in the water/sorbate/flavor until thoroughly combined. Viscosity will increase noticeably. Total mix time for this step is about 2 minutes.
During these steps the temperature of the mixture should be kept above melting point of the fat.

The emulsion so obtained had a viscosity of appr. 1,100 cP at 68° F. and 20 rpm, spindle B.

Next, the emulsion so obtained was converted into a whipped topping using the following procedure:
Replace the mixing paddle of the Hobart mixer with whip (Wire Whip D) and then mix on Speed 3.
Aerate the topping to a specific gravity of 0.35-0.55 to obtain a topping with a texture suitable for cake decorating.

During whipping the viscosity of the emulsion rapidly increased. The properties of the whipped topping are summarized in Table 2.

TABLE 2

| pH | 6.13 |
|---|---|
| Water activity | 0.861 |
| Specific gravity | 0.338 g/ml |

TABLE 2-continued

| | |
|---|---|
| Calculated water content | 37 wt. % |
| Viscosity freshly prepared[1] | 140,000 cP |
| Viscosity after 12 hours ambient[1] | 112,000 cP |

[1]68° F., 10 rpm, Helipath spindle D

The whipped topping showed excellent ambient stability

Example 2

A whippable topping was prepared on the basis of the recipe shown in Table 3.

TABLE 3

| Ingredient | Wt. % |
|---|---|
| Fat[1] | 6.00 |
| Alpha-cyclodextrin | 5.00 |
| High fructose corn syrup (42%) | 64.90 |
| Carboxymethyl cellulose | 0.20 |
| Modified pregelatinized starch[2] | 1.00 |
| Corn syrup solids[3] | 1.20 |
| Sodium chloride | 0.40 |
| Sodium alginate | 0.20 |
| Calcium sulfate | 0.10 |
| Lactic acid solution (80%) | 0.04 |
| Water | 19.00 |
| Potassium sorbate (30%) | 0.66 |
| Cream flavour | 0.30 |

[1]Ultimate ® 110 (ex Cargill, USA)
[2]Inscosity ® B656 (ex GPC, USA)
[3]Maltrin ® M200 (ex GPC, USA)

A whippable emulsion was prepared using the procedure described in Example 1, except that this time starch was dry blended together with the starch, salt, alginate etc. In the Waring blender. The emulsion had a viscosity of appr. 1100 cP (68° F., 20 rpm, Helipath spindle B).

The emulsion was whipped using the procedure described in Example 1 to obtain a whipped topping with the properties described in Table 4.

TABLE 4

| | |
|---|---|
| pH | 6.05 |
| Water activity | 0.833 |
| Specific gravity | 0.300 g/ml |
| Calculated water content | 38.5 wt. % |
| Viscosity freshly prepared[1] | 17,000 cP |
| Viscosity after 12 hours ambient[1] | 22,000 cP |

[1]68° F., 20 rpm, Helipath spindle C

The whipped topping displayed excellent ambient stability

Example 3

A whippable topping was prepared on the basis of the recipe shown in Table 5.

TABLE 5

| Ingredient | Wt. % |
|---|---|
| Canola oil | 11.00 |
| Fat[1] | 7.00 |
| Alpha cyclodextrin | 5.00 |
| High fructose corn syrup (42%) | 48.87 |
| Carboxymethyl cellulose | 0.13 |
| Modified tapioca starch[2] | 1.20 |
| Corn syrup solids | 0.80 |

TABLE 5-continued

| Ingredient | Wt. % |
|---|---|
| Sodium chloride | 0.40 |
| Sodium alginate | 0.13 |
| Calcium sulfate | 0.05 |
| Lactic acid solution (80%) | 0.04 |
| Water | 24.42 |
| Potassium sorbate (30%) | 0.66 |
| Cream flavour | 0.30 |

[1]Ultimate ® 110 (ex Cargill, USA)
[2]Ultra-Tex ® 3 (ex Ingredion, USA)

The emulsion had a viscosity of appr. 1500 cP (68° F., 20 rpm, Helipath spindle B).

A whipped topping was prepared using the procedure described in Example 2. The properties of this whipped topping are summarized in Table 6.

TABLE 6

| | |
|---|---|
| pH | 5.88 |
| Water activity | 0.879 |
| Specific gravity | 0.339 g/ml |
| Calculated water content | 38.9 wt. % |

The whipped topping displayed excellent ambient stability

Example 4

A whippable topping was prepared on the basis of the recipe shown in Table 6.

TABLE 6

| Ingredient | Wt. % |
|---|---|
| Fat[1] | 9.00 |
| Alpha cyclodextrin | 6.50 |
| High fructose corn syrup (42%) | 62.43 |
| Carboxymethyl cellulose | 0.20 |
| Maltodextrin DE 20 | 1.20 |
| Sodium chloride | 0.40 |
| Sodium alginate | 0.20 |
| Calcium sulfate | 0.07 |
| Lactic acid solution (80%) | 0.04 |
| Water | 19.00 |
| Potassium sorbate (30%) | 0.66 |
| Cream flavour | 0.30 |

[1]Ultimate ® 110 (ex Cargill, USA)

The emulsion had a viscosity of appr. 1100 cP (68° F., 20 rpm, Helipath spindle B).

A whipped topping was prepared using the procedure described in Example 2. The properties of this whipped topping are summarized in Table 8.

TABLE 8

| | |
|---|---|
| pH | 6.19 |
| Water activity | 0.856 |
| Specific gravity | 0.406 g/ml |
| Measured water content | 39.7 wt. % |

The whipped topping displayed excellent ambient stability

Example 5

A whippable topping was prepared on the basis of the recipe shown in Table 9.

TABLE 9

| Ingredient | Wt. % |
| --- | --- |
| IE Icing shortening[1] | 8.43 |
| Stearic acid | 0.50 |
| Alpha cyclodextrin | 6.50 |
| High fructose corn syrup (42%) | 61.59 |
| Carboxymethyl cellulose | 0.13 |
| Modified instant food starch[2] | 1.20 |
| Corn syrup solids | 0.80 |
| Sodium chloride | 0.20 |
| Sodium alginate | 0.13 |
| Calcium sulfate | 0.04 |
| Polysorbate 80 | 0.09 |
| Lactic acid solution (80%) | 0.08 |
| Water | 19.35 |
| Potassium sorbate (30%) | 0.66 |
| Cream flavour | 0.30 |

[1]Product code 106257 (ex Stratas, USA) - Iodine Value 94-102, Dropping point (48-52° C.)
[2]Ultra-Tex ® 8 (ex Ingredion, USA)

The emulsion had a viscosity of appr. 2400 cP (68° F., 20 rpm, Helipath spindle B).

A whipped topping was prepared using the procedure described in Example 2, except that 81% of the total amount of HCFS was preblended with CMC and that the polysorbate and the remainder of the HCFS were admixed in the Waring blender after preparation of the dry mix containing starch, salt, alginate, maltodextrin and calcium sulphate, followed by 30 seconds of further mixing.

The properties of this whipped topping are summarized in Table 10.

TABLE 10

| | |
| --- | --- |
| pH | 5.60 |
| Water activity | 0.886 |
| Specific gravity | 0.400 g/ml |
| Calculated water content | 39 wt. % |

The whipped topping displayed excellent ambient stability

Example 6

A whippable topping was prepared on the basis of the recipe shown in Table 11.

TABLE 11

| Ingredient | Wt. % |
| --- | --- |
| IE Icing Shortening | 8.91 |
| Alpha cyclodextrin | 6.50 |
| High fructose corn syrup (42%) | 60.71 |
| Carboxymethyl cellulose | 0.10 |
| Modified instant food starch[1] | 2.00 |
| Maltodextrin DE 20 | 0.80 |
| Sodium chloride | 0.20 |
| Sodium alginate | 0.40 |
| Polysorbate 80 | 0.09 |
| Lactic acid solution (80%) | 0.08 |
| Water | 19.25 |
| Potassium sorbate (30%) | 0.66 |
| Cream flavor | 0.30 |

[1]Ultra-Tex ® 8 (ex Ingredion, USA)

The emulsion had a viscosity of appr. 3000 cP (68° F., 20 rpm, Helipath spindle B).

A whipped topping was prepared using the procedure described in Example 5.

The properties of this whipped topping are summarized in Table 12.

TABLE 12

| | |
| --- | --- |
| Specific gravity | 0.540 g/ml |
| Calculated water content | 39 wt. % |

The whipped topping displayed excellent ambient stability

Example 7

A whippable topping was prepared on the basis of the recipe shown in Table 13.

TABLE 13

| Ingredient | Wt. % |
| --- | --- |
| Palm kernel oil | 18.07 |
| Alpha cyclodextrin | 6.02 |
| High fructose corn syrup (42%) | 49.87 |
| Carboxymethyl cellulose | 0.50 |
| Modified tapioca starch[1] | 0.85 |
| Sodium chloride | 0.20 |
| Sodium alginate | 0.05 |
| Calcium sulfate | 0.07 |
| Lactic acid solution (80%) | 0.10 |
| Water | 23.59 |
| Potassium sorbate (30%) | 0.67 |

[1]Ultra-Tex ® 8 (ex Ingredion, USA)

The emulsion had a viscosity of appr. 3300 cP (68° F., 20 rpm, Helipath spindle B).

A whipped topping was prepared using the procedure described in Example 1.

The properties of this whipped topping are summarized in Table 14.

TABLE 14

| | |
| --- | --- |
| pH | 5.30 |
| Water activity | 0.870 |
| Specific gravity | 0.470 g/ml |
| Calculated water content | 38 wt. % |
| Viscosity freshly prepared[1] | 72,000 cP |
| Viscosity after 12 hours ambient[1] | 72,000 cP |

[1]68° F., 5 rpm, Helipath spindle B

The whipped topping displayed excellent ambient stability

Example 8

A whippable topping was prepared on the basis of the recipe shown in Table 15.

TABLE 15

| Ingredient | Wt. % |
| --- | --- |
| Coconut oil | 20.54 |
| Alpha cyclodextrin | 4.56 |
| High fructose corn syrup (42%) | 44.85 |
| Hydroxypropyl methylcellulose[1] | 0.34 |
| Modified tapioca starch[2] | 2.00 |
| Sodium chloride | 0.23 |
| Sodium alginate | 0.06 |
| Calcium sulfate | 0.08 |
| Lactic acid solution (80%) | 0.11 |
| Water | 26.47 |
| Potassium sorbate (30%) | 0.77 |

[1]Methocel ® K99 (ex Dow, USA)
[2]Ultra-Tex ® 8 (ex Ingredion, USA)

The emulsion had a viscosity of appr. 3500 cP (68° F., 20 rpm, Helipath spindle B).

A whipped topping was prepared using the procedure described in Example 1.

The properties of the whipped topping are described in Table 16.

TABLE 16

| | |
|---|---|
| Specific gravity | 0.580 g/ml |
| Measured water content | 38.4 wt. % |
| Viscosity freshly prepared[1] | 130,000 cP |
| Viscosity after 12 hours ambient[1] | 124.000 cP |

[1]68° F., 10 rpm, spindle F

The whipped topping displayed excellent ambient stability

Comparative Example A

Whipped chocolate syrup was prepared on the basis of the recipe shown in table 17.

TABLE 17

| Ingredient | Wt. % |
|---|---|
| Granulated sucrose | 29.50 |
| Dutched cocoa 10/12 | 7.50 |
| Water | 46.00 |
| Soybean oil | 10.00 |
| Alpha cyclodextrin | 7.00 |

The whipped syrup was prepared by mixing sugar, cocoa and water having a temperature of 68° F. (20° C.) (at high speed in a Waring blender for 3 minutes. The end temperature of 23. Next the blend mixed for 5 minutes in a Hobart mixer at Speed 2. The cyclodextrin was mixed with the soybean oil as described in Example 1. Next, the oil/cyclodextrin mixture was added to the sugar/cocoa/water mixture in the Hobart mixer and the combined ingredients were mixed for 5 minutes at Speed 2 (the mixture had too low a viscosity to be mixed at Speed 3). After minutes of stirring at Speed 2, the mixture had developed enough viscosity to be stirred at 3 for another 5 minutes. The whipped chocolate syrup so obtained had a temperature of 68° F. (20° C.) and a specific gravity of 0.54 g/ml.

The whipped chocolate syrup was piped through a large star tip into rosette. These rosettes were not sufficiently firm to be used as typical cake decorations. The ambient shelf-life of the whipped chocolate syrup was very limited. Changes to the texture and gas cell size and distribution were marked. Rosettes became rubbery and quickly lost their short texture.

Comparative Example B

Comparative Example A was repeated except that this time the whipped chocolate syrup was prepared on the basis of the recipe shown in Table 18.

TABLE 18

| Ingredient | Wt. % |
|---|---|
| Granulated sucrose | 29.17 |
| Dutched cocoa 10/12 | 7.50 |
| Xanthan gum | 0.33 |
| Water | 46.00 |
| Soybean oil | 10.00 |
| Alpha cyclodextrin | 7.00 |

The xanthan gum was combined with the sugar, cocoa and water in the Waring blender before addition of the oil/cyclodextrin mixture. Again, the whipped chocolate syrup was piped through a large star tip into rosette. These rosettes were very rigid and did not have a sufficiently 'short' texture. The ambient shelf-life of these rosettes was very limited.

The invention claimed is:

1. An aeratable oil-in-water emulsion comprising a continuous aqueous phase and a dispersed oil phase, the aeratable emulsion comprising:
    (a) 20-45 wt. % water;
    (b) 4-40 wt. % oil;
    (c) 3-12 wt. % of cyclodextrin selected from alpha-cyclodextrin, beta-cyclodextrin and combinations thereof;
    (d) 20-60 wt. % of saccharides selected from monosaccharides, disaccharides, non-cyclic oligosaccharides, sugar alcohols and combinations thereof; and
    (e) 0-10 wt. % of other edible ingredients;
    wherein the aeratable emulsion comprises at least 80% of the saccharides by weight of water, and when aerated to a specific gravity of 0.25-0.75, does not suffer from fluid drainage when kept under ambient conditions for two days.

2. The emulsion according to claim 1, having a viscosity of at least 100 cP at 20° C. at 20 rpm.

3. The emulsion according to claim 1, wherein the emulsion has a water activity of less than 0.95.

4. The emulsion according to claim 1, comprising 25-42 wt. % water.

5. The emulsion according to claim 1, wherein the oil comprises no more than 40 wt. % saturated fatty acid residues, calculated on total amount of fatty acid residues.

6. The emulsion according to claim 1, wherein the oil has a solid fat content at 20° C. ($N_{20}$) of less than 20%.

7. The emulsion according to claim 1, wherein the oil comprises at least 50 wt. % of vegetable oil selected from soybean oil, sunflower oil, rapeseed oil, cottonseed oil, linseed oil, maize oil, safflower oil, olive oil and combinations thereof.

8. The emulsion according to claim 1, wherein the oil comprises at least 30 wt. % of lauric fat.

9. The emulsion according to claim 1, comprising 5-30 wt. % oil.

10. The emulsion according to claim 1, comprising at least 90% saccharides by weight of water.

11. The emulsion according to claim 1, comprising at least 80% monosaccharides by weight of water, the monosaccharides being selected from fructose, glucose and combinations thereof.

12. The emulsion according to claim 1, comprising 25-50 wt. % of the saccharides.

13. The emulsion according to claim 1, wherein the cyclodextrin is alpha-cyclodextrin.

14. The emulsion according to claim 1, comprising 4-10 wt. % of cyclodextrin.

15. The emulsion according to claim 1, comprising 25-120% cyclodextrin by weight of the oil.

16. The emulsion according to claim 1, comprising 0.03-1.2 wt. % of a cellulose derivative selected from carboxymethyl cellulose, hydroxypropyl cellulose and combinations thereof.

17. The emulsion according to claim 1, comprising 0.2-4 wt. % of a starch component selected from starch, modified starch and combinations thereof.

18. The emulsion according to claim 1, wherein the emulsion is pourable at 20° C.

19. An aerated oil-in-water emulsion comprising a continuous aqueous phase and a dispersed oil phase, the aerated emulsion comprising:
(a) 20-45 wt. % water;
(b) 4-40 wt. % oil;
(c) 3-12 wt. % of cyclodextrin selected from alpha-cyclodextrin, beta-cyclodextrin and combinations thereof;
(d) 20-60 wt. % of saccharides selected from monosaccharides, disaccharides, non-cyclic oligosaccharides, sugar alcohols and combinations thereof; and
(e) 0-10 wt. % of other edible ingredients;
wherein the aerated emulsion comprises at least 80% of the saccharides by weight of water, has a specific gravity of 0.25-0.75, and does not suffer from fluid drainage when kept under ambient conditions for two days.

20. A foodstuff comprising 1-50 wt. % of the aerated emulsion according to claim 19.

21. The foodstuff according to claim 20, wherein the foodstuff is a product selected from cake, pie, custard, non-frozen dessert, frozen dessert, ice cream, fruit pieces and confectionary.

22. A method of preparing a foodstuff according to claim 20, comprising heating the foodstuff comprising the aerated emulsion to a temperature in excess of 60° C. (140° F.) for at least 1 minute.

23. A process of preparing an emulsion according to claim 19, comprising mixing oil and cyclodextrin to prepare an oil-and-cyclodextrin mixture, followed by mixing the mixture with one or more water-continuous components to produce an oil-in-water emulsion; and aerating the emulsion to a specific gravity of 0.25-0.75.

24. The emulsion according to claim 1, comprising 5-20 wt. % oil.

25. The emulsion according to claim 1, comprising 5-9 wt. % cyclodextrin.

26. The emulsion according to claim 1, comprising 40-60 wt. % saccharides.

27. The emulsion according to claim 1, comprising 25-30 wt. % water.

28. The emulsion according to claim 1, comprising 80-180% of the saccharides by weight of water.

29. The emulsion according to claim 1, wherein the saccharide is a monosaccharide.

30. The emulsion according to claim 1, wherein the monosaccharide is provided as high fructose corn syrup.

31. The emulsion according to claim 1, comprising 0.1-0.8 wt. % carboxymethyl cellulose.

32. The emulsion according to claim 1, comprising 0.4-2.5 wt. % modified instant corn starch.

33. The emulsion according to claim 1, comprising:
(a) 20-45 wt. % water;
(b) 5-20 wt. % oil;
(c) 3-9 wt. % of cyclodextrin selected from alpha-cyclodextrin, beta-cyclodextrin and combinations thereof;
(d) 20-40 wt. % of saccharides selected from monosaccharides, disaccharides, non-cyclic oligosaccharides, and combinations thereof; and
(e) 0-10 wt. % of other edible ingredients;
wherein the aeratable emulsion comprises at least 80-180% of the saccharides by weight of water.

* * * * *